United States Patent
Patil

(10) Patent No.: US 6,391,140 B1
(45) Date of Patent: May 21, 2002

(54) ADHESIVE MATERIAL WITH FLEXIBILITY MODIFIERS

(75) Inventor: Girish Shivaji Patil, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/113,987

(22) Filed: Jul. 10, 1998

(51) Int. Cl.[7] ............................................... B32B 31/00
(52) U.S. Cl. ..................... 156/275.5; 156/329; 156/330
(58) Field of Search ................................. 428/448, 447, 428/414, 521, 522; 524/265; 347/67, 86, 87; 156/275.5, 330, 329

(56) References Cited

U.S. PATENT DOCUMENTS

| | | |
|---|---|---|
| 4,112,436 A | 9/1978 | Cone |
| 4,287,326 A | 9/1981 | Mikami .................... 525/476 |
| 4,318,766 A | 3/1982 | Smith |
| 4,344,006 A | 8/1982 | Mendelsohn |
| RE31,357 E | 8/1983 | Cone |
| 4,689,085 A | 8/1987 | Plueddemann ......... 106/287.14 |
| 4,694,029 A | 9/1987 | Land |
| 4,837,274 A | 6/1989 | Kawakubo et al. |
| 4,878,978 A | 11/1989 | Goel et al. |
| 4,921,880 A | 5/1990 | Lee et al. ..................... 522/12 |
| 4,945,145 A | 7/1990 | Bruylants et al. ........... 526/279 |
| 4,952,643 A * | 8/1990 | Hirose et al. ............... 525/407 |
| 4,975,488 A | 12/1990 | Furukawa et al. ........... 525/100 |
| 5,013,383 A | 5/1991 | Chapman .................. 156/307.3 |
| 5,041,481 A | 8/1991 | Sugimori et al. ........... 524/188 |
| 5,059,989 A | 10/1991 | Eldridge et al. |
| 5,188,864 A | 2/1993 | Lee et al. ..................... 427/515 |
| 5,218,381 A | 6/1993 | Narang et al. |
| 5,294,835 A | 3/1994 | Igarashi et al. ............. 257/793 |
| 5,322,557 A | 6/1994 | Inomata et al. ........ 106/287.14 |
| RE34,675 E | 7/1994 | Plueddemann ........... 106/287.1 |
| 5,335,004 A | 8/1994 | Matsuhisa .................... 347/44 |
| 5,338,614 A | 8/1994 | Bartz et al. ................. 428/448 |
| 5,395,872 A | 3/1995 | DiRuocco et al. .......... 524/284 |
| 5,399,604 A | 3/1995 | Sano et al. .................. 524/356 |
| 5,401,581 A | 3/1995 | Bartz et al. ................. 428/451 |
| 5,450,110 A | 9/1995 | Sato et al. |
| 5,493,320 A | 2/1996 | Sandbach, Jr. et al. |
| 5,514,729 A | 5/1996 | Diamant et al. |
| 5,550,185 A * | 8/1996 | Inoue et al. ................. 524/847 |
| 5,565,275 A | 10/1996 | Schmidt et al. |
| 5,650,805 A | 7/1997 | Shimomura et al. .......... 347/20 |
| 5,663,752 A | 9/1997 | Imamura et al. .............. 347/65 |
| 5,856,373 A | 1/1999 | Kaisaki et al. |
| 5,964,931 A * | 10/1999 | Korper .................... 106/31.93 |

\* cited by examiner

*Primary Examiner*—Paul Thibodeau
*Assistant Examiner*—D Lawrence Tarazano
(74) *Attorney, Agent, or Firm*—John A. Brady

(57) ABSTRACT

This invention relates to novel adhesive compositions that resist chemical degradation from ink components, are not brittle and display excellent adhesion properties. The adhesive compositions contain a multifunctional compound, a non-acrylic silane coupling agent and a flexibility modifier.

13 Claims, 1 Drawing Sheet

ADHESIVE MATERIAL WITH FLEXIBILITY MODIFIERS

This application is related to contemporaneously filed U.S. patent application Ser. No. 09/113,249, entitled "IMPROVED ADHESIVE MATERIAL FOR USE WITH THERMAL INK JET PRINTERS", now abandoned, the disclosure of which is incorporated herein by reference.

FIELD OF THE INVENTION

The present invention relates to an improved adhesive suitable for use in ink jet printers, and more particularly, to a flexible adhesive for attaching ink jet printheads to print cartridge containers.

BACKGROUND OF THE INVENTION

In the production of thermal ink jet print cartridges for use in ink jet printers, a printhead is bonded to a print cartridge container. The printhead includes an ink-receiving opening and ink supply channels through which ink travels to a plurality of bubble chambers. Each bubble chamber includes a resistor which, when addressed with an energy pulse, momentarily vaporizes the ink and forms a bubble which expels an ink droplet. The printhead typically comprises a heater chip and a nozzle plate having a plurality of discharge orifices formed therein.

The container serves as a reservoir for the ink and includes a fluid supply opening which communicates with the ink-receiving opening of the printhead for supplying ink to the bubble chambers in the printhead.

During assembly of the printhead to the print cartridge container, an adhesive is used to bond the two elements together. The flexible adhesive also "fixes" the printhead to the print cartridge container such that its location relative to the print cartridge container is known and does not shift during processing or use. Further, the flexible adhesive provides an additional function in serving as a fluid gasket against leakage of ink.

However, the printhead and the print cartridge container typically have dissimilar coefficients of thermal expansion, since the surface of the printhead bonded to the print cartridge container most commonly is silicon and the print cartridge container is, for example, a polymeric material such as a modified phenylene oxide. Thus, the flexible adhesive must accommodate both the dissimilar expansions and contractions of the printhead and the print cartridge container and be impermeable to attack by the ink, which is commonly in a vehicle of water and at least one glycol and/or glycol ether plus a colorant, plus substances such as pH modifiers, biocides, etc.

Typical adhesive materials comprise an epoxy resin, such as a bisphenol-A based epoxy resin, a cross-linking agent and an initiator. They may also include pigments and modifiers to alter their physical properties. Some conventional adhesives offer good adhesive properties and others offer good chemical resistance to inks. However, none of these conventional adhesives exhibit good adhesion properties while at the same time exhibiting good chemical resistance to inks.

Additionally, conventional adhesive materials often comprise anhydride cross-linkers which typically absorb water and result in voids (air pockets) in the flexible adhesive upon curing. Such voids are not desirable because they can, for example, result in a non-homogeneous adhesive having poor adhesion characteristics. They may also cause mixing of inks as a result of channel formation in the adhesive layer. Further, adhesive materials comprising anhydrides typically have poor shelf lives and poor pot lives, and, therefore, are often difficult to work with and store.

Conventional adhesive materials also tend to be nonflexible and brittle after curing. This causes the adhesive materials to often chip or crack. It also can cause the components (e.g., printhead and ink jet print cartridge container) that the adhesive material is keeping together to come apart, chip or crack. Such events can result in ink leakage and poor adhesion as well as malfunctioning of ink jet printers. Moreover, attempts to make adhesive materials more flexible after curing often lead to adhesive materials that are not resistant to chemical degradation by inks.

Accordingly, it is seen that a need exists in the art for a flexible adhesive composition suitable for use in ink jet printers, and particularly, for attaching printheads to print cartridge containers.

SUMMARY OF THE INVENTION

This need is met by the present invention, wherein adhesive compositions are provided which exhibit superior adhesion properties while at the same time unexpectedly exhibiting good chemical resistance to inks as well as acceptable pot lives and shelf lives. Moreover, the adhesive compositions of this invention unexpectedly are substantially depleted of voids after curing and are flexible and non-brittle after curing.

In a first embodiment, the present invention is directed to a flexible adhesive composition comprising: (a) an additive comprising at least one multifunctional compound selected from the group consisting of a monomer, oligomer and polymer; (b) at least one non-acrylic silane coupling agent selected from the group consisting of a non-acrylic silane coupling agent capable of becoming an electrophile and a non-acrylic silane coupling agent capable of becoming a nucleophile; and (c) a flexibility modifier, with the proviso that the flexible adhesive composition does not comprise an anhydride.

In a second embodiment, the present invention is directed to an ink jet print cartridge container comprising the novel flexible adhesive compositions of this invention to bond a printhead thereto.

In a third embodiment, the present invention is directed to a method for attaching a printhead to an ink jet print cartridge container.

While the flexible adhesive compositions of this invention comprise the constituents mentioned above (e.g., the additive, coupling agent and flexibility modifier), it is within the scope of this invention for the flexible adhesive composition to consist essentially of or consist of the same.

DETAILED DESCRIPTION OF THE INVENTION

Figure 1:
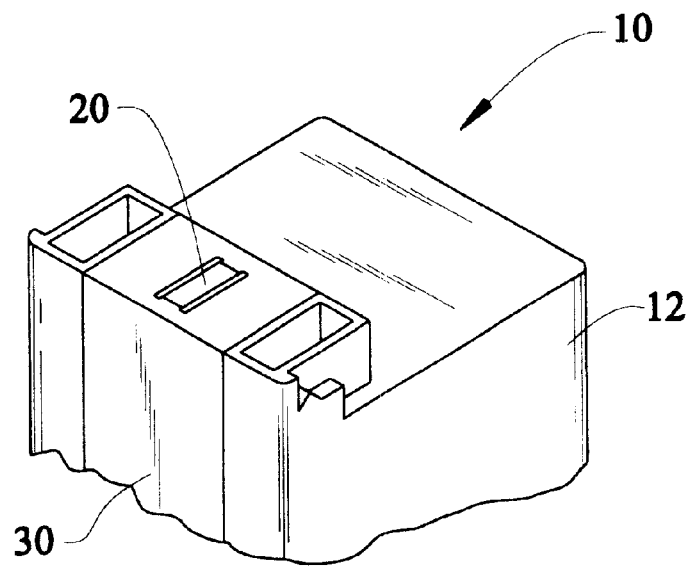
FIG. 1 is a perspective view of a portion of an ink jet print cartridge.

Referring now to FIG. 1, there is shown an ink jet print cartridge 10 which is adapted to be used in an ink jet printer (not shown). The print cartridge 10 comprises an ink-filled container 12, a printhead 20, which is adhesively secured to the container 12, and a flexible circuit 30 (also referred to as a TAB circuit). The container 12 is typically formed from a polymeric material such as polyphenylene oxide, which is commercially available from, for example, the General Electric Company under the Trademark "NORYL SE-1".

Figure 2:
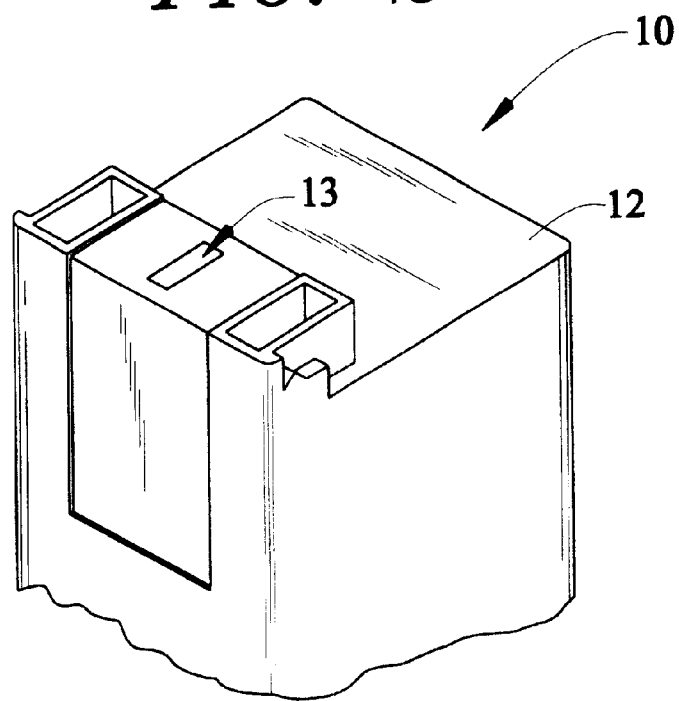
FIG. 2 is a perspective view of the ink jet cartridge shown in FIG. 1 without the printhead (ink jet print cartridge container).

Referring now to FIG. 2, there is shown the ink jet print cartridge of FIG. 1 before the printhead 20 and the flexible circuit 30 are assembled to the container 12. The flexible adhesive composition with flexibility modifier of the present invention is typically applied to a printhead-receiving portion 13 on the container 12, which, in the illustrated embodiment, comprises a recessed area. After the flexible adhesive composition has been applied, for example, to the printhead-receiving portion 13, the printhead 20 is positioned in the receiving portion 13 and the flexible adhesive composition of the present invention is typically cured by baking at about 110 degrees Celsius for approximately 45 minutes.

The printhead 20 includes an ink-receiving opening (not shown) and ink supply channels (not shown) through which ink travels to a plurality of bubble chambers (not shown). Each bubble chamber includes a resistor (not shown) which, when addressed with an energy pulse, momentarily vaporizes the ink and forms a bubble which expels an ink droplet. The printhead comprises a heater chip and a nozzle plate having a plurality of discharge orifices formed therein.

A discussion of a printhead 20 and a flexible circuit 30 which may form part of the print cartridge 10 is set out in U.S. patent application Ser. No. 08/827,140, entitled "A Process for Joining a Flexible Circuit to a Polymeric Container and for Forming a Barrier Layer over Sections of the Flexible Circuit and other Elements using an Encapsulant Material", the disclosure of which is incorporated herein by reference.

As used herein, the term "multifunctional compound" is defined to mean any compound having a total of at least two groups, substituents (including moieties) or the like, wherein each independently can become difunctional, act as a leaving group, and/or become a nucleophile. Additives comprising multifunctional compounds for use as component (a) include compounds functionalized with at least two functionalization members selected from the group consisting of an epoxy, cyclic ether, lactone, lactam and triazine group, with epoxy-functionalized compounds, such as epoxy resins, being preferred.

The epoxy resins which may be employed in this invention include commercially available resins like bisphenol-A based epoxy resins, including Epon 828, Epon 836 and Epon 1001, all available from Shell Chemical Co., and 3,4-epoxycyclohexylmethyl-3,4-epoxyhexane carboxylate, available from Union Carbide. Other examples of the epoxy resins which may be employed are epoxy novolacs, such as D.E.N. 431, D.E.N. 438, and D.E.N. 439, which are available from Dow Chemical. The epoxy resins are often available with or without initiators mixed therein.

Other additives comprising multifunctional compounds, which may be employed in this invention, include, for example, those, which may be made by art-recognized techniques. Such techniques include reacting functionalized precursors like epichlorohydrin and aromatic precursors like bisphenol-A in the presence of heat, a catalyst or both to thereby cause substitution reactions.

The average number molecular weight ($M_n$) of the multifunctional compounds employed in this invention is limited only to the extent that the compounds are capable of resulting in an adhesive composition. Often, the multifunctional compounds have a $M_n$ of greater than about 600, and preferably, greater than 2,000.

The non-acrylic silane coupling agents for use as component (b) are silane compounds having at least one difunctional group which is capable of becoming an electrophile or capable of becoming a nucleophile. The non-acrylic silane coupling agents suitable for use in the present invention as component (b) include non-acrylic silane coupling agents represented by the formula:

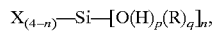

wherein X is a monovalent organic group having an epoxy, cyclic ether, lactone, lactam, or triazine group; R is a $C_1$–$C_6$ alkyl or aryl group; p is 0, 1 or 2 and q is 0, 1 or 2, with the proviso that p and q cannot simultaneously be 0, 1 or 2; and n is 1, 2 or 3.

The non-acrylic silane coupling agents which may be employed in this invention are commercially available. Also, they may be prepared by, for example, reacting a trialkoxysilyl alkanol and halogenated epoxide in the presence of heat, a catalyst, or both to thereby cause a substitution reaction. The most preferred non-acrylic silane coupling agents employed in this invention are those having n as 3, p as 0, q as 1, R as methyl and X as glycidoxypropyl (3-glycidoxypropyltrimethoxysilane), referred to by the trade name designation Z-6040 and commercially available from Dow Chemical.

The flexibility modifiers which may be employed in this invention are typically polymers with a backbone having at least one structural unit selected from the group consisting of

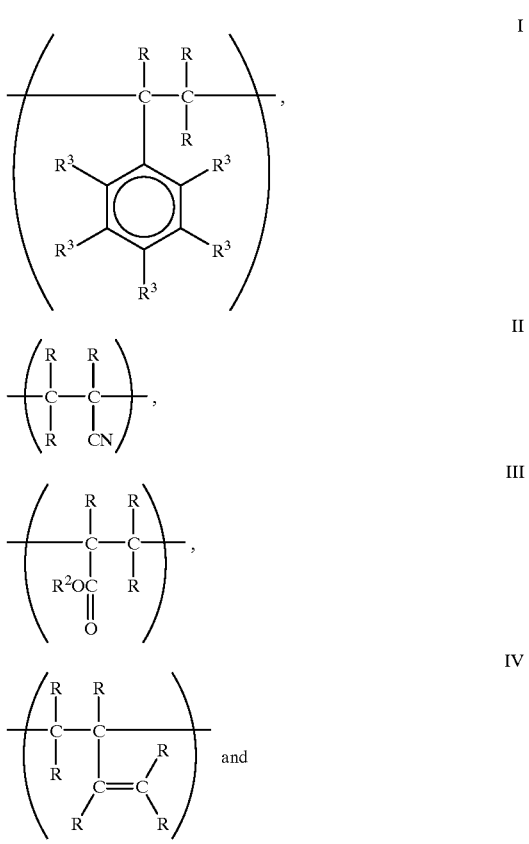

-continued

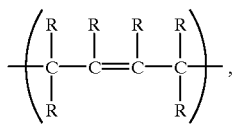

wherein i) each R is independently a hydrogen, hydroxy, $C_{1-6}$ alkyl, halogen, nitrile, nitro, aryl, sulfonate group ($SO_3R^2$), ($COOR^2$), lactone, lactam, cyclic ether, epoxy, triazine group or

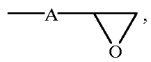

wherein A is a divalent bridging radical;

ii) each $R^2$ is independently a hydrogen, $C_{1-6}$ alkyl or aryl; and iii) each $R^3$ is independently a hydrogen, $C_{1-6}$ alkyl or

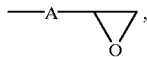

wherein A is a divalent bridging radical.

The flexibility modifiers may be, for example, homopolymers, copolymers (e.g., including terpolymers), block, diblock and triblock polymers as well as random polymers. The flexibility modifiers are, therefore, generally only limited to the extent that they result in an adhesive composition that is flexible after curing.

The flexibility modifiers (polymers) are not limited to any cis- or trans-arrangement and the relative chirality of monomer units that make up the polymer backbone may be either isotactic, atactic or syndiotactic in nature. Moreover, the backbone of the flexibility modifier may include head-to-head, head-to-tail and tail-to-tail linkages.

There generally is no limitation with respect to the groups which terminate the flexibility modifiers used in this invention other than that the termination groups (end-capping groups) result in flexibility modifiers capable of being used, for example, in adhesive compositions employable in ink jet printer applications.

An illustrative list of the termination groups which may be used in this invention include at least one member selected from the group consisting of hydroxy, aldehyde, ester, epoxy, amide and carboxylic acid groups. Often, the preferred termination group is a carboxylic acid group.

It is also noted herein that the flexibility modifiers often comprise about 0.5 percent by weight to about 30.0 percent by weight functionalization groups (groups other than hydrogen, either terminating, on the polymer backbone, or both) based on total weight of the flexibility modifier, including all ranges subsumed therein. Preferably, however, the flexibility modifiers have from about 1.0 percent by weight to about 20.0 percent by weight of functionalization groups and, most preferably, from about 4.0 percent by weight to about 10.0 percent by weight functionalized groups based on total weight of the flexibility modifier, including all ranges subsumed therein.

In a preferred embodiment, the flexibility modifiers employed in this invention comprise structural units represented by structural unit II, and structural unit(s) IV, V or both, and are therefore acrylonitrile-co-butadiene copolymers. Such preferred acrylonitrile-co-butadiene copolymers are commercially available from Aldrich Chemical. In a most preferred embodiment, the acrylonitrile-co-butadiene copolymers are terminated with carboxylic acid groups.

The molecular weight of the flexibility modifiers which may be employed in this invention is limited only to the extent that the flexibility modifiers result in an adhesive composition that is flexible after curing. Often, the flexibility modifier has a weight average molecular weight from about 500 to about 25,000, and, preferably, from about 1,000 to about 10,000, and, most preferably, from about 2,000 to about 4,000, including all ranges subsumed therein.

While the flexibility modifiers employed in this invention are commercially available from, for example, Aldrich Chemical, they may also be prepared via art-recognized techniques which include free radical polymerizations (e.g., solution, emulsion, neat) of the respective precursor monomers in the presence of a catalyst like benzylperoxide or 2,2'-azobisisobutyronitrile.

Initiators may also be employed in the flexible adhesive compositions of the present invention and they are generally classified as low-temperature initiators (i.e., they enhance curing below 120 degrees Celsius). They typically are the resulting addition product of an epoxy and an amine and are often classified as epoxy-amine adducts, including, for example, epoxy-imidazole adducts. The initiators which may be employed in this invention are commercially available. A preferred initiator employed in this invention is Ajicure MY 24 which is available from Ajinomoto USA, Inc.

The amount of additive comprising at least one multifunctional compound employed in the flexible adhesive compositions of this invention is limited only to the extent that the resulting composition is capable of being employed as an adhesive composition. Often, however, the flexible adhesive compositions of this invention comprise from about 55.0 percent to about 98.5 percent, and, preferably, from about 75.0 percent to about 95.0 percent, and, most preferably, from about 80.0 percent to about 90.0 percent by weight of additive comprising at least one multifunctional compound, based on total weight of flexible adhesive composition, and including all ranges subsumed therein.

The amount of non-acrylic silane coupling agent employed in this invention is limited only to the extent that the resulting composition is capable of being employed as an adhesive composition. Often, however, the flexible adhesive compositions of this invention comprise from about 0.5 percent to about 20.0 percent, and, preferably, from about 1.0 percent to about 10.0 percent, and, most preferably, from about 2.0 percent to about 5.0 percent by weight of silane, based on total weight of the flexible adhesive composition, and including all ranges subsumed therein.

The amount of flexibility modifier added to the flexible adhesive compositions of this invention is only limited to the extent that the resulting adhesive composition is flexible after curing. Generally, the amount of flexibility modifier employed is about 1.0 percent to about 25.0 percent, and, preferably, from about 2.0 percent to about 15.0 percent, and, most preferably, from about 4.0 percent to about 8.0 percent by weight based on total weight of the flexible adhesive composition, including all ranges subsumed therein.

The amount of initiator which may be employed in this invention is limited only to the extent that the resulting composition is capable of being employed as an adhesive composition. Often, however, the flexible adhesive compositions comprise from about 0.5 percent to about 35.0 percent, and, preferably, from about 1.0 percent to about 20.0 percent, and, most preferably, from about 5.0 percent to about 15.0 percent by weight of initiator, based on total weight of flexible adhesive composition, and including all ranges subsumed therein.

There generally is no limitation with respect to how the components of the flexible adhesive compositions of this invention are combined. Typically, they are mixed, agitated or stirred via any art-recognized technique, including mixing in a mixing vessel like a beaker. The flexible adhesive composition may be mixed, for example, at atmospheric pressure and ambient temperature or any other temperature or pressure levels that result in an adhesive composition. It is important, however, that the conditions do not cause the flexible adhesive composition to cure in the mixing vessel.

It is also within the scope of this invention to combine any of the art-recognized additives to the flexible adhesive compositions. Such additives include colorants like pigments and dyes, and especially, rheology modifiers. An illustrative list of the rheology modifiers which may be used in this invention include group IIA carbonates such as calcium carbonate, and transition metal oxides such as titanium dioxide. The most preferred rheology modifier is, however, fumed silica.

The amount of rheology modifier employed in this invention is limited only to the extent that the resulting flexible adhesive composition is capable of being employed as an adhesive composition. Generally, the flexible adhesive compositions of this invention comprise from about 1.0 percent to about 25.0 percent, and, preferably, from about 2.0 percent to about 15.0 percent, and, most preferably, from about 3.0 percent to about 10.0 percent by weight of rheology modifier, based on total weight of the flexible adhesive composition, and including all ranges subsumed therein.

Moreover, the viscosities of the flexible adhesive compositions employed in this invention are often from about 5,000 cps to about 200,000 cps, and, preferably, from about 10,000 cps to about 100,000 cps, and, most preferably, from about 35,000 cps to about 50,000 cps, including all ranges subsumed therein. Such viscosities are determined with a Haake Viscometer, No. VT-500, at ambient temperature and with a PK1-1 spindle.

There is generally no limitation with respect to the use of the flexible adhesive compositions of the instant invention. In fact, the flexible adhesive compositions of this invention may be employed in any applications requiring low-temperature curing adhesives. Often, however, the flexible adhesive compositions of this invention are used in ink jet printer applications. Typically, the flexible adhesive compositions are applied to the printheads or the print cartridge containers (or both) of ink jet printers. The flexible adhesive compositions of this invention are used in ink jet printer applications to primarily bond (fix) the printhead to the print cartridge container and to serve as a barrier or gasket to prevent ink leakage from a reservoir of the print cartridge container.

The print cartridge containers that may be used with the flexible adhesive compositions of this invention include those, for example, having one to three ink reservoirs and molded from commercially available polyphenylene ether compositions. An illustrative example of the print cartridge container which may be employed in the invention is described in U.S. Pat. No. 5,576,750, assigned to Lexmark International, Inc., and incorporated herein by reference.

The following examples are to facilitate and further illustrate the understanding of this invention. Therefore, the examples are not intended as a restriction on the scope of the invention.

EXAMPLE 1

An adhesive composition (control) was prepared by mixing, in a beaker, 13.75 g of bisphenol-A based epoxy resin, (Epon 828, commercially available from Shell Chemical Co.), 4.38 g of a second epoxy resin (D.E.N. 431, commercially available from Dow Chemical), 0.2 g of 3-glycidoxypropyltrimethoxysilane coupling agent (commercially available from Aldrich Chemical) and 2.0 g of initiator (Ajicure, commercially available from Ajinomoto USA, Inc.). To the resulting mixture was added 0.65 g of fumed silica and the contents were stirred to produce a homogeneous adhesive composition. The homogeneous adhesive composition was dispensed onto five flat Noryl SE-1 plates (2"×2"). The dispensing was achieved with a dispensing apparatus that forced the adhesive composition out of a tube by delivering compressed air to the tube. The amount of adhesive composition dispensed onto the plates was enough to cover substantially the entire bottom of the silicon chips capable of being used on ink jet print cartridges. On top of the dispensed adhesive composition was placed the ink jet silicon chips. After baking in an oven at 110 degrees Celsius for about 45 minutes, the adhesive composition cured and the silicon chips were bonded to the plates. The plates having the bonded silicon chips were soaked in boiling water for about two hours to test and observe the quality of the bonds. After the soaking, none of the silicon chips were removable when reasonable force was applied with a screwdriver.

Also, the adhesive composition was used to make three test bars (dog bones) in accordance with ASTM Standards. The resulting test bars were analyzed on a commercially available Dynamic Mechanical Analyzer to measure Young's Modulus. The composition had a Young's Modulus of about 1200 MPa.

EXAMPLE 2

The adhesive composition of Example 2 was prepared and tested in a manner similar to that described in Example 1 except that 1.88 g of epoxy/hydroxy functionalized polybutadiene (commercially available from Aldrich Chemical, and greater than 30 percent by weight functionalization) was added to the adhesive composition. The resulting adhesive composition had adhesion properties similar to those in the adhesive composition of Example 1. However, when 3 test bars of the adhesive composition were analyzed on a Dynamic Mechanical Analyzer, the composition had a Young's Modulus of about 1400 MPa, indicating that adhesion properties were retained while flexibility decreased (increase in brittleness).

EXAMPLE 3

The adhesive composition of Example 3 was prepared and tested in a manner similar to that described in Example 1 except that 1.8 g of dicarboxy terminated poly(acrylonitrile-co-butadiene) (commercially available from Aldrich Chemical) was added to the adhesive composition. The resulting adhesive composition had adhesion properties similar to those of the adhesive composition of Example 1. However, when 3 test bars of the composition were analyzed on a Dynamic Mechanical Analyzer, the composition had a Young's Modulus of about 580 MPa. These superior and unexpected results indicate that the novel adhesive compositions of this invention retain adhesion properties while simultaneously becoming more flexible.

What is claimed is:

1. A method for bonding an ink jet printhead to a print cartridge container, comprising in the following order the steps of:

(a) applying an adhesive composition to an ink jet printhead or an ink jet print cartridge container or both, said adhesive composition comprising:
  (i) an additive comprising at least one multifunctional compound selected from the group consisting of a monomer, oligomer and polymer capable of forming a cross link polymeric network;
  (ii) at least one non-acrylic silane coupling agent selected from the group consisting of a non-acrylic silane coupling agent capable of becoming an electrophile and a non-acrylic silane coupling agent capable of becoming a nucleophile, and
  (iii) a flexibility modifier, with the proviso that the adhesive composition does not comprise an anhydride;
(b) placing the ink jet printhead on the print cartridge container; and
(c) curing the adhesive composition following the applying and placing steps.

2. The method in accordance with claim 1 wherein the flexibility modifier comprises about 5.0 percent by weight to about 30.0 percent by weight of functionalization groups based upon total weight of said flexibility modifier.

3. The method in accordance with claim 2, wherein said flexibility modifier comprises structural units which are 1,2-butadiene derived, 1,4-butadiene derived, or both 1,2- and 1,4-butadiene derived, and acrylonitrile derived.

4. The method in accordance with claim 1, wherein said adhesive composition further comprises an initiator.

5. The method in accordance with claim 1, wherein said multifunctional compound is a polymer comprising an epoxy-functionalized resin.

6. The method in accordance with claim 5, wherein said epoxy-functionalized resin is a bisphenol-A based epoxy resin.

7. The method in accordance with claim 11, wherein said non-acrylic silane coupling agent has the formula

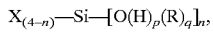

wherein X is a monovalent organic group having an epoxy, cyclic ether, lactone, lactam or triazine group; R is a $C_{1-6}$ alkyl or aryl group; p is 0, 1 or 2 and q is 0, 1 or 2, with the proviso that p and q cannot simultaneously be 0, 1 or 2; and n is 1, 2 or 3.

8. The method in accordance with claim 4, wherein said initiator is an epoxy-amine adduct.

9. The method in accordance with claim 1, wherein said adhesive composition comprises from about 55.0 percent to about 98.5 percent by weight of said multifunctional compound.

10. The method in accordance with claim 1, wherein said adhesive composition further comprises a rheology modifier selected from the group consisting of group IIA carbonates, transition metal oxides and fumed silica.

11. The method in accordance with claim 1, wherein said adhesive composition comprises from about 1.0 percent to about 25.0 percent by weight of said flexibility modifier.

12. A method for bonding an ink jet printhead to a print cartridge container, comprising in the following order the steps of:
(a) applying an adhesive composition to an ink jet printhead or an ink jet print cartridge container or both, said adhesive composition comprising:
  (i) an additive comprising at least one multifunctional compound selected from the group consisting of a monomer, oligomer and polymer, said additive being functionalized with at least two functionalization members selected from a group consisting of an epoxy, cyclic ether, lactone, lactam and triazine group;
  (ii) at least one non-acrylic silane coupling agent selected from the group consisting of a non-acrylic silane coupling agent capable of becoming an electrophile and a non-acrylic silane coupling agent capable of becoming a nucleophile, and
  (iii) a flexibility modifier, with the proviso that the adhesive composition does not comprise an anhydride;
(b) placing the ink jet printhead on the print cartridge container; and
(c) curing the adhesive composition following the applying and placing steps.

13. The method for bonding an ink jet printhead to a print cartridge container in accordance with claim 12, wherein said flexibility modifier has a backbone having at least one structural unit selected from the group consisting of

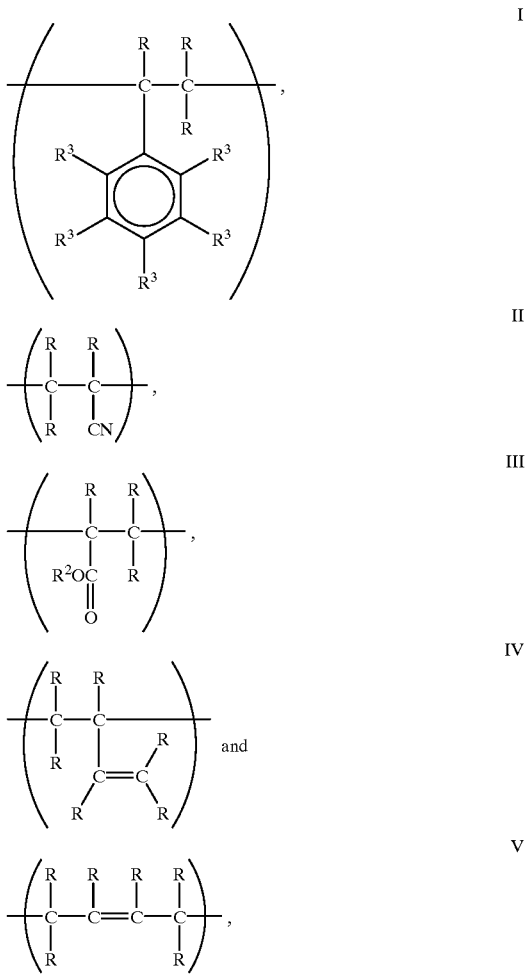

wherein
i) each R is independently a hydrogen, hydroxy, $C_{1-6}$ alkyl, halogen, nitrile, nitro, aryl, sulfonate group ($SO_3R^2$), ($COOR^2$), lactone, lactam, cyclic ether, epoxy, triazine group or

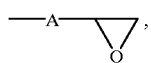
wherein A is a divalent bridging radical;
ii) each $R^2$ is independently a hydrogen, $C_{1-6}$ alkyl or aryl; and
iii) each $R^3$ is independently a hydrogen, $C_{1-6}$ alkyl or
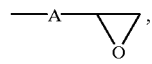
wherein A is a divalent bridging radical.
* * * * *